(12) United States Patent
Kim et al.

(10) Patent No.: US 12,045,628 B2
(45) Date of Patent: Jul. 23, 2024

(54) ELECTRONIC DEVICE AND METHOD OF CONTROLLING SAME

(71) Applicant: Samsung Electronics Co., Ltd., Suwon-si (KR)

(72) Inventors: Keunseob Kim, Suwon-si (KR); Jeongdong Hwang, Suwon-si (KR); Jaeman Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/438,218

(22) PCT Filed: Jan. 7, 2020

(86) PCT No.: PCT/KR2020/000230
§ 371 (c)(1),
(2) Date: Sep. 10, 2021

(87) PCT Pub. No.: WO2020/184827
PCT Pub. Date: Sep. 17, 2020

(65) Prior Publication Data
US 2022/0179661 A1 Jun. 9, 2022

(30) Foreign Application Priority Data
Mar. 14, 2019 (KR) .......................... 10-2019-0029520

(51) Int. Cl.
*G06F 9/455* (2018.01)
*G06F 9/445* (2018.01)
(Continued)

(52) U.S. Cl.
CPC ................ *G06F 9/445* (2013.01); *G06F 9/48* (2013.01); *G06N 20/00* (2019.01)

(58) Field of Classification Search
CPC ...................................................... G06F 9/445
(Continued)

(56) References Cited

U.S. PATENT DOCUMENTS

| 9,888,067 B1 | 2/2018 | Yemini et al. |
| 9,910,720 B2 | 3/2018 | Karhunen |

(Continued)

FOREIGN PATENT DOCUMENTS

| KR | 10-2017-0085072 A | 7/2017 |
| KR | 10-2019-0014580 A | 2/2019 |
| KR | 10-2019-0016895 A | 2/2019 |

OTHER PUBLICATIONS

Korean Office Acton with English translation dated Sep. 18, 2023; Korean Appln. No. 10-2019-0029520.
(Continued)

*Primary Examiner* — Mehran Kamran
(74) *Attorney, Agent, or Firm* — Jefferson IP Law, LLP

(57) ABSTRACT

A method for providing an artificial intelligence service based on a serverless platform is provided. The method includes the operations of determining a container into which artificial intelligence models are to be loaded, on the basis of features of a plurality of containers and features of a plurality of artificial intelligence models registered in a model store, loading the artificial intelligence models into the container, upon receiving a request for an artificial intelligence service from a client, obtaining a function corresponding to the requested artificial intelligence service from a database, determining the container in which the artificial intelligence model corresponding to the requested artificial intelligence service is loaded, by executing the obtained function on the container, acquiring data with (Continued)

regard to the request, from the artificial intelligence model loaded in the container, and transferring the acquired data to a client.

13 Claims, 6 Drawing Sheets

(51) Int. Cl.
*G06F 9/48* (2006.01)
*G06N 20/00* (2019.01)
(58) Field of Classification Search
USPC .......................................................... 718/100
See application file for complete search history.

(56) References Cited

U.S. PATENT DOCUMENTS

| | | | |
|---|---|---|---|
| 11,126,463 B2 | 9/2021 | Kim et al. | |
| 11,170,309 B1* | 11/2021 | Stefani | H04L 63/0428 |
| 11,537,439 B1* | 12/2022 | Liberty | G06F 9/5077 |
| 11,573,814 B1* | 2/2023 | Aithal | G06F 16/188 |
| 11,853,401 B1* | 12/2023 | Nookula | G06N 20/00 |
| 11,880,749 B2* | 1/2024 | Deshpande | G06N 20/00 |
| 2016/0162320 A1* | 6/2016 | Singh | G06F 9/5005 |
| | | | 718/1 |
| 2017/0213156 A1* | 7/2017 | Hammond | G06F 8/31 |
| 2017/0256017 A1* | 9/2017 | Gandhi | G06T 1/60 |
| 2017/0293762 A1* | 10/2017 | Karhunen | G06F 9/466 |
| 2017/0344910 A1* | 11/2017 | Wu | G06N 20/00 |
| 2018/0101403 A1* | 4/2018 | Baldini Soares | G06Q 20/22 |
| 2018/0173502 A1* | 6/2018 | Biskup | G06F 21/56 |
| 2018/0248770 A1* | 8/2018 | Regmi | G06F 9/45558 |
| 2018/0270301 A1* | 9/2018 | Zhang | H04L 67/1001 |
| 2018/0293463 A1 | 10/2018 | Brown | |
| 2018/0300653 A1* | 10/2018 | Srinivasan | H04L 67/06 |
| 2019/0050258 A1* | 2/2019 | Kim | G06F 9/5011 |
| 2019/0050749 A1* | 2/2019 | Sanketi | G06F 9/44505 |
| 2019/0050756 A1* | 2/2019 | Dirac | G06N 20/00 |
| 2019/0258964 A1* | 8/2019 | Dube | G06F 16/22 |
| 2019/0279114 A1* | 9/2019 | Deshpande | G06N 20/00 |
| 2019/0378052 A1* | 12/2019 | Badhwar | G06N 20/00 |
| 2020/0014588 A1* | 1/2020 | Narang | G06V 10/762 |
| 2020/0036615 A1* | 1/2020 | Lewis | H04L 63/10 |
| 2020/0089515 A1* | 3/2020 | Hari | G06N 3/02 |
| 2020/0104385 A1* | 4/2020 | Zheng | G06F 9/45558 |
| 2020/0151261 A1* | 5/2020 | Kurian | G06N 20/00 |
| 2020/0311617 A1* | 10/2020 | Swan | G06F 9/45558 |
| 2021/0406774 A1* | 12/2021 | Browne | G06F 8/38 |
| 2022/0179661 A1* | 6/2022 | Kim | G06N 7/01 |
| 2022/0405637 A1* | 12/2022 | Buehl | H04L 67/10 |

OTHER PUBLICATIONS

Vatche Ishakian et al., "Serving deep learning models in a serverless platform", IEEE International Conference on Cloud Engineering (IC2E), DOI: 10.1109/IC2E 2018.00052, Apr. 17, 2018.
Kyung-Soo Jang et al., "A Study on High Performance GPU based Container Cloud System supporting TensorFlow Serving Deployment Service", vol. 24, No. 2, pp. 386-388, Nov. 2017.
Jaewook Kim et al., "GPU Enabled Serverless Computing Framework", 26th Euromicro International Conference on Parallel, Distributed, and Network-Based Processing, Aug. 23, 2018).
Algorithmia, Inc., "Shrink the time to deploy each ML Model from months to minutes", Feb. 28, 2019.
Dakkak et al.; TrIMS Transparent and Isolated Model Sharing for Low Latency Deep Learning Inference in Function as a Service Environments; arXiv:1811.09732v1 [cs.DC]; Nov. 24, 2018.
European Search Report dated Mar. 25, 2022; European Appln. No. 20769450.6—1213 / 3933585 PCT/KR2020000230.
European Search Report dated Jan. 15, 2024; European Appln. No. 20 769 450.6—1213.
Korean Office Action with English translation dated May 30, 2024; Korean Appln. No. 10-2019-0029520.

\* cited by examiner

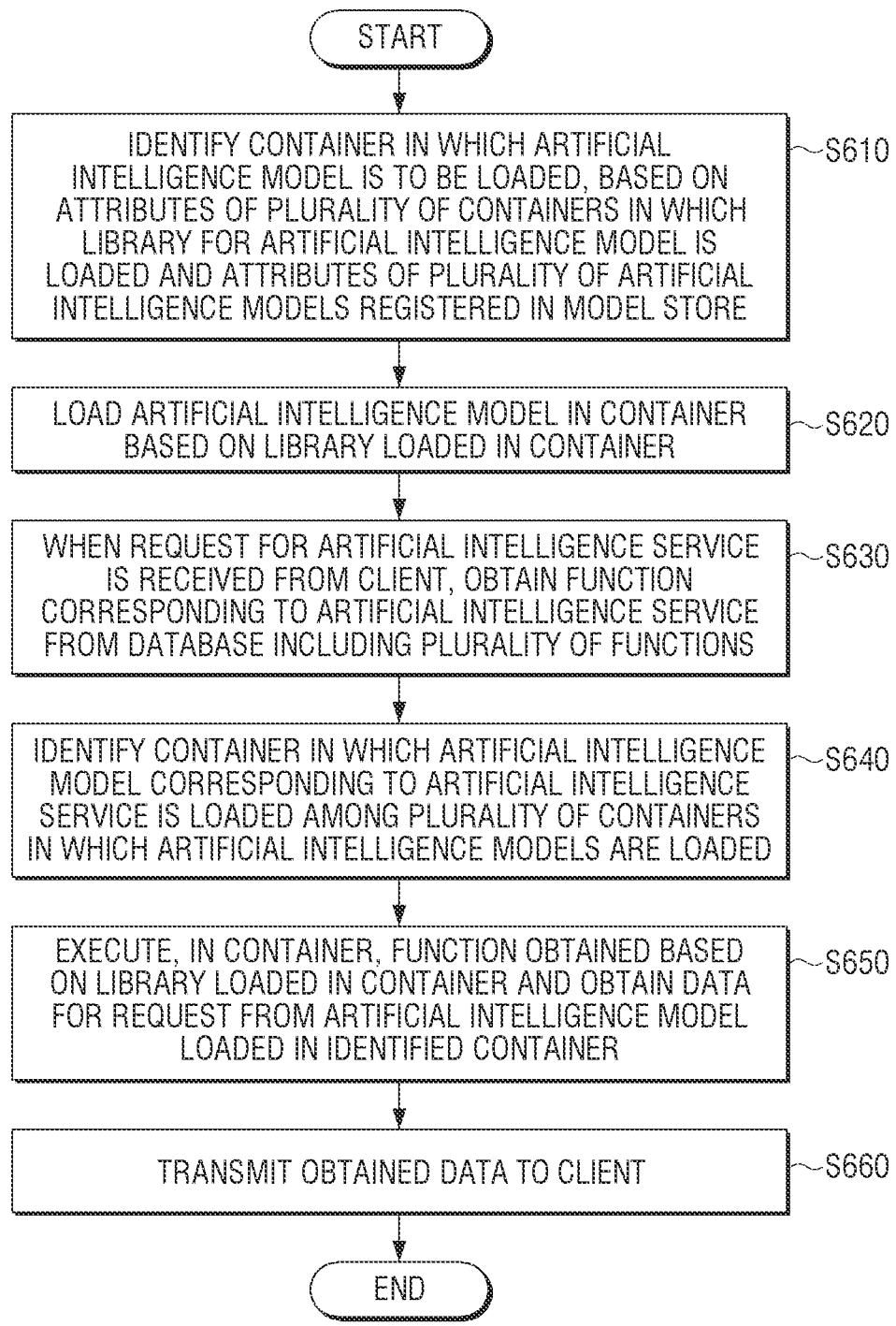

ELECTRONIC DEVICE AND METHOD OF CONTROLLING SAME

CROSS-REFERENCE TO RELATED APPLICATION(S)

This application is a U.S. National Stage application under 35 U.S.C. § 371 of an International application number PCT/KR2020/000230, filed on Jan. 7, 2020, which is based on and claims priority of a Korean patent application number 10-2019-0029520, filed on Mar. 14, 2019, in the Korean Intellectual Property Office, the disclosure of which is incorporated by reference herein in its entirety.

BACKGROUND

1. Field

The disclosure relates to an electronic device and a method for controlling the same. More particularly, the disclosure relates to an electronic device providing an artificial intelligence service in a serverless-based system and a method for controlling the same.

2. Description of Related Art

Recently, with the development of cloud computing technologies, there is an increasing interest in container-based computing technology and serverless-based computing technology.

In particular, recently, the container-based computing technology and the artificial intelligence technology are combined and a technology for providing an artificial intelligence service (AI service) in a container-based computing environment is widely used.

In relation thereto, FIG. 1 is a diagram illustrating an artificial intelligence service provided in a container-based computing system according to the related art.

In the container-based environment, an artificial intelligence model client (or artificial intelligence model developer) may provide a trained artificial intelligence model file, a model prediction code for the trained model, and operation information on the artificial intelligence model to an artificial intelligence service client (or artificial intelligence service developer). Herein, the trained artificial intelligence model file may be a file including a hidden layer of the trained artificial intelligence model and labeling information output as a result value by the artificial intelligence model, the model prediction code for the trained model may include a code or a program necessary for obtaining a result value for an input value of the trained model, and the operation information on the artificial intelligence model may include resource information such as a central processing unit (CPU), a graphics processing unit (GPU), a memory, and the like minimally necessary to use the artificial intelligence model.

In the container-based environment, the artificial intelligence service client may reflect the trained artificial intelligence model file and the prediction code for the trained model obtained from the artificial intelligence model client to generate a function for providing the artificial intelligence service, and provide the generated function to an artificial intelligence service server (artificial intelligence server (AI server)).

A client that desires to use the artificial intelligence service may request the artificial intelligence service server for the artificial intelligence service, and the server may provide a result value obtained by executing the function provided by the service client to the client.

Meanwhile, in the container-based environment, the artificial intelligence service client may generate a container for providing the artificial intelligence service and provide this to the artificial intelligence service server (artificial intelligence server (AI server)).

The artificial intelligence service client may realize the trained artificial intelligence model file (or model binary) and a Representational State Transfer (REST)ful API server in the container. Specifically, the artificial intelligence service client may generate a RESTful API server ensuring auto scaling, high availability, and the like of the container in the container and manage this.

Meanwhile, in the container-based artificial intelligence service providing environment, a plurality of containers may be provided for one artificial intelligence service, for high availability of the container, that is, for constantly keeping the container available.

The container provided by the artificial intelligence service client may provide the artificial intelligence service to the client by using a CPU or a GPU of the artificial intelligence service server. For this, the artificial intelligence service client may provision resources such as a CPU, a GPU, a memory, and the like of the artificial intelligence service server necessary for maintenance and management of the container on the container.

If the artificial intelligence service is provided by using the CPU, it is disadvantageous that efficiency such as an execution speed of the artificial intelligence service is low, and if the artificial intelligence service is provided by using the GPU, it is disadvantageous that high cost is required due to high cost of the GPU.

Accordingly, there is an attempt to provide the artificial intelligence service in a serverless environment, instead of providing the artificial intelligence service in the container-based environment.

The serverless computing refers to a system in which a developer does not need to concern about provisioning or operating of the server, and if a source code (or function) of an application is created and registered on the server, a platform autonomously executes the corresponding code and returns a result.

The term "serverless" may imply that the server does not exist, but it does not mean that the server does not exist physically. The serverless computing is a system providing a method for using the resource only when it is necessary based on an event, and the term "serverless" is used, since there is no dedicated server separately provisioned for the corresponding event.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device providing an artificial intelligence service in a serverless computing system environment and a method for controlling the same.

Additional aspects will be set forth in part in the description which follows and, in part, will be apparent from the description, or may be learned by practice of the presented embodiments.

In accordance with an aspect of the disclosure, an artificial intelligence service providing method based on a serverless platform is provided. The method includes identifying a container in which an artificial intelligence model is to be loaded, based on attributes of a plurality of containers in which a library for artificial intelligence models is loaded and attributes of a plurality of artificial intelligence models registered in a model store, loading the artificial intelligence model in the container based on the library loaded in the containers, based on a request for an artificial intelligence service being received from a client, obtaining a function corresponding to the requested artificial intelligence service from a database including a plurality of functions, identifying a container in which an artificial intelligence model corresponding to the artificial intelligence service is loaded among the plurality of containers in which artificial intelligence models are loaded, and obtaining data for the request from the artificial intelligence model loaded in the identified container by executing, in the container, the obtained function based on the library loaded in the container, and transmitting the obtained data to the client.

The identifying the container in which the artificial intelligence model is to be loaded may include identifying the container in which the artificial intelligence model is to be loaded based on resources provisioned to the plurality of containers and resources required to the plurality of artificial intelligence models.

The identifying the container in which the artificial intelligence model is to be loaded may include identifying a resource usable in each container based on the resources provisioned respectively to the plurality of containers and the resources required to the artificial intelligence model loaded in each container, and identifying the container in which the artificial intelligence model is to be loaded based on the identified resource.

The identifying the container in which the artificial intelligence model is to be loaded may include, based on the artificial intelligence model being registered in the model store, identifying the container in which the registered artificial intelligence model is to be loaded based on the attributes of the plurality of containers and the attribute of the registered artificial intelligence model.

The method may further include, based on the obtained function being executed while the container is in a first state, identifying the state of the container as a second state.

Based on a number of containers in the first state among the plurality of containers being less than a predetermined number, generating a new container.

The method may further include, based on the container which has executed the obtained function not receiving a request for an artificial intelligence service using a model included in the container during predetermined time, killing the container which has executed the obtained function.

The identifying the container in which the artificial intelligence model is to be loaded may include identifying a container in which the artificial intelligence model which has been loaded in the killed container is to be newly loaded, based on attributes of remaining containers except for the killed container and an attribute of the artificial intelligence model which has been loaded in the killed container.

The plurality of containers may execute a function corresponding to an artificial intelligence service requested from the client based on a graphic processing unit (GPU) or a central processing unit (CPU).

The method may further include collecting information on execution time of the function in each container, the function corresponding to the artificial intelligence service requested from the client, and the identifying the container in which the artificial intelligence model is to be loaded may include identifying a container in which the function is to be executed among the GPU-based container and the CPU-based container based on the collected information.

In accordance with another aspect of the disclosure, an electronic device providing an artificial intelligence service based on a serverless platform is provided. The electronic device includes a communicator, a memory including a database including a plurality of functions, and a processor configured to identify a container in which an artificial intelligence model is to be loaded, based on attributes of a plurality of containers in which a library for artificial intelligence models is loaded and attributes of a plurality of artificial intelligence models registered in a model store, load the artificial intelligence model in the container based on the library loaded in the containers, based on a request for an artificial intelligence service being received from a client via the communicator, obtain a function corresponding to the requested artificial intelligence service from the database, identify a container in which an artificial intelligence model corresponding to the requested artificial intelligence service is loaded among the plurality of containers, obtain data for the request from the artificial intelligence model loaded in the identified container by executing, in the container in which the artificial intelligence model corresponding to the artificial intelligence service is loaded, the obtained function based on the library loaded in the container, and transmit the obtained data to the client via the communicator.

The processor may be configured to identify the container in which the artificial intelligence model is to be loaded based on resources provisioned to the plurality of containers and resources required to the plurality of artificial intelligence models.

The processor may be configured to identify a resource usable in each container based on the resources provisioned respectively to the plurality of containers and the resources required to the artificial intelligence model loaded in each container, and identify the container in which the artificial intelligence model is to be loaded based on the identified resource.

The processor may be configured to, based on the artificial intelligence model being registered in the model store, identify the container in which the registered artificial intelligence model is to be loaded based on the attributes of the plurality of containers and the attribute of the registered artificial intelligence model.

The processor may be configured to, based on the obtained function being executed while the container is in a first state, identify the state of the container as a second state, and based on a number of containers in the first state among the plurality of containers being less than a predetermined number, generate a new container.

The processor may be configured to, based on the container which has executed the obtained function not receiving a request for an artificial intelligence service using a model included in the container during predetermined time, kill the container which has executed the obtained function.

The processor may be configured to identify a container in which the artificial intelligence model which has been loaded in the killed container is to be newly loaded, based on attributes of remaining containers except for the killed container and an attribute of the artificial intelligence model which has been loaded in the killed container.

The plurality of containers execute a function corresponding to an artificial intelligence service requested from the client based on a graphic processing unit (GPU) or a central processing unit (CPU).

The processor may be configured to collect information on execution time of the function in each container, the function corresponding to the artificial intelligence service requested from the client, and identify a container in which the function is to be executed based on the collected information.

The electronic device according to the disclosure may provide the artificial intelligence services efficiently using the resources in the serverless computing system environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a flowchart illustrating a method for controlling an electronic device according to an embodiment of the disclosure.

The same reference numerals are used to represent the same elements throughout the drawings.

DETAILED DESCRIPTION

Figure 1:
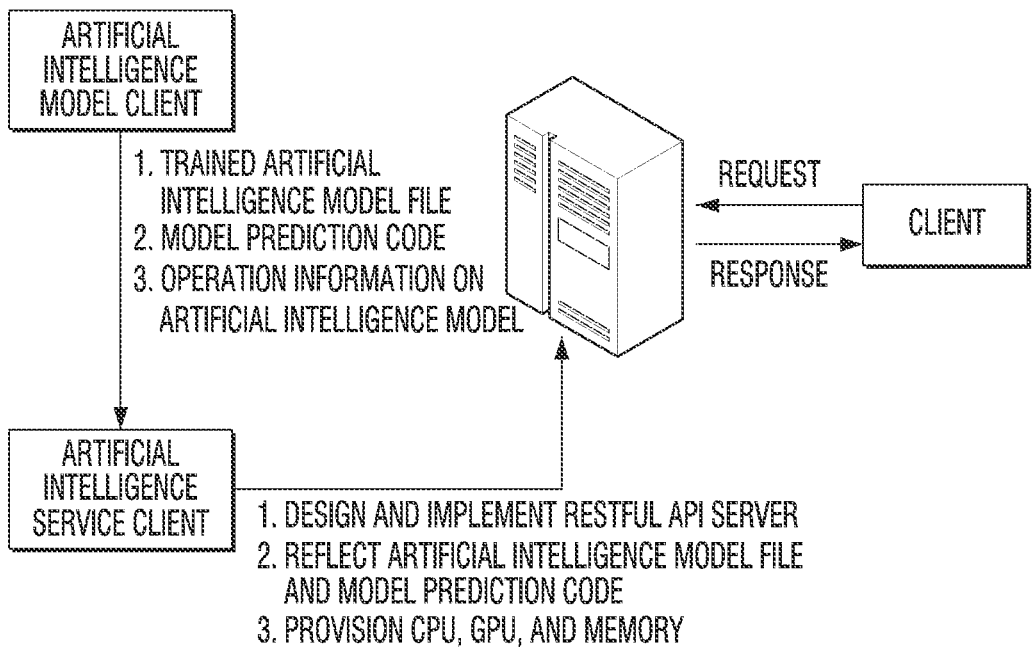
FIG. 1 is a diagram illustrating a container computing system according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements. For example, a first user device and a second user device may represent user devices different from each other, regardless of order and/or importance. For example, a first element may be referred to as a second element and the second element may also be similarly referred to as the first element, while not departing from the scope of a right of the disclosure.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

The terms used in the disclosure are merely used for describing specific embodiments and do not limit the scope of a right of the disclosure. Unless otherwise defined specifically, a singular expression may encompass a plural expression. The terms used herein including technical or scientific terms may refer to the same terms generally understood by those skilled in the art in the technical field of the disclosure. The terms defined in normal dictionaries among the terms used in the disclosure may be interpreted as the same or similar meanings in the related technologies and are not interpreted as ideal or excessively formal meanings. In some cases, the terms defined in the disclosure may not be interpreted to exclude the embodiments of the disclosure.

Hereinafter, the disclosure will be described in greater detail with reference to the drawings. However, in describing the disclosure, a detailed description of the related art or configuration may be omitted when it is determined that the detailed description may unnecessarily obscure a gist of the disclosure. In relation to explanation of the drawings, similar reference numerals may be used for similar elements.

Embodiments of the disclosure relate to a serverless computing system. The serverless computing system may provide a cloud computing method of executing a code for an event requested from a client to reply a response. The term "serverless" herein may refer to that there is no server separately provisioned for the corresponding event so that a developer does not need to manage infrastructure and platform.

Figure 2:
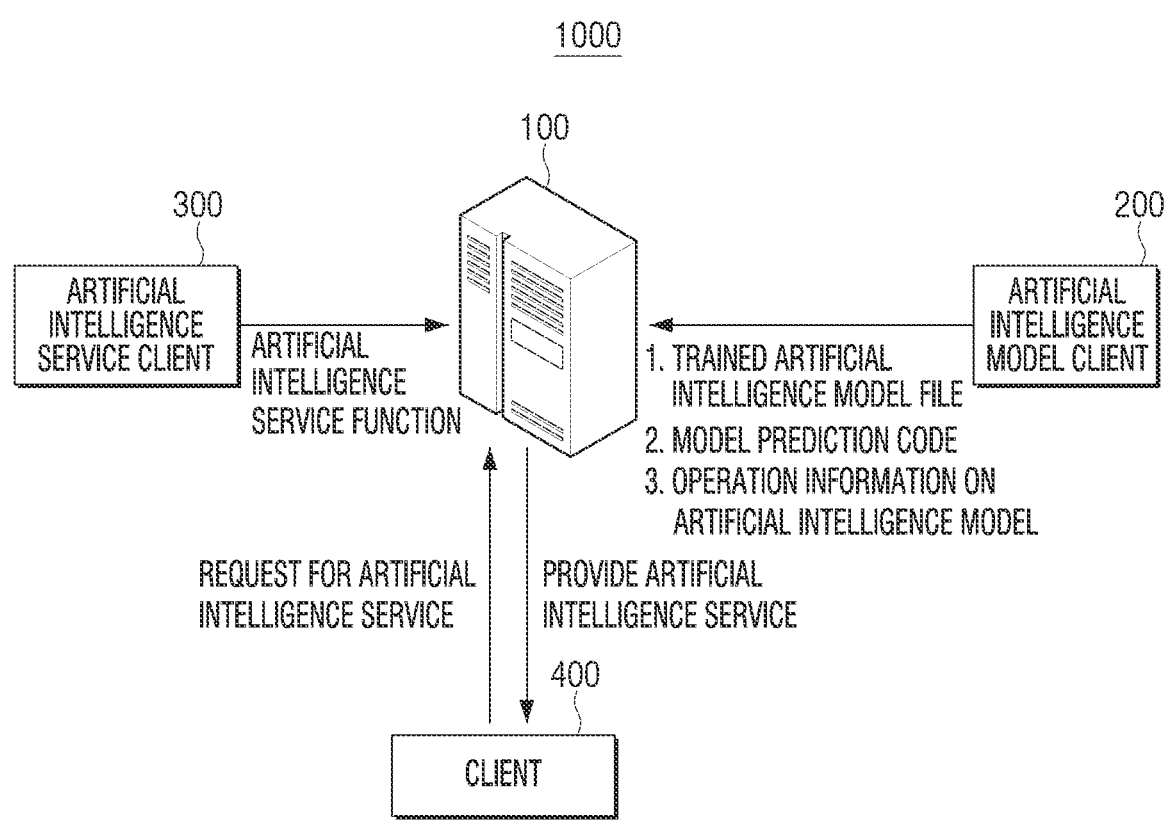
FIG. 2 is a diagram illustrating a serverless computing system including an electronic device according to an embodiment of the disclosure.

FIG. 2 is a diagram illustrating a serverless computing system including an electronic device according to an embodiment of the disclosure.

Referring to FIG. 2, a serverless computing system 1000 may include an electronic device 100, an artificial intelligence model client 200, an artificial intelligence service client 300, and a client 400.

The electronic device 100 of the disclosure may provide an artificial intelligence service to the client 400.

In the disclosure, the artificial intelligence service is a service provided to the client 400 through the electronic device 100 and may specifically refer to all services provided to the client 400 by using an artificial intelligence model included in the electronic device 100.

For example, the artificial intelligence service of the disclosure may be any one of services for providing suitable services to the client 400 by using artificial intelligence models performing functions such as natural language processing, machine translation, a dialogue system, questioning and answering, voice recognition/synthesis, object recognition, object tracking, image searching, human recognition, scene understanding, space understanding, image enhancement, knowledge/probability-based inference, optimization prediction, preference-based planning, recommendation, knowledge construction (data generation/classification), knowledge management (data utilization), and the like.

In order to provide the artificial intelligence service, the electronic device 100 may receive an artificial intelligence (AI) service function from the artificial intelligence service client 300 and store the AI service function in the electronic device 100.

The artificial intelligence service client 300 may correspond to an electronic device of an artificial intelligence service developer.

The artificial intelligence service client 300 may generate a function corresponding to the artificial intelligence service and provide this to the electronic device 100. The function corresponding to the artificial intelligence service is an assembly of codes for executing a specific operation of the artificial intelligence service and may include a model prediction code provided by the artificial intelligence model client 200.

Specifically, the artificial intelligence service client 300 may select a trained artificial intelligence model and a mode prediction code registered in a model store (not illustrated).

The artificial intelligence service client 300 may generate an artificial intelligence service function for executing the specific operation based on the selected artificial intelligence model and model prediction code and provide this to the electronic device 100.

Meanwhile, the artificial intelligence model client 200 may register a trained artificial intelligence model file, a model prediction code, and operation information on the artificial intelligence model in the model store (not illustrated). The trained artificial intelligence model file may be a file including a hidden layer of the trained artificial intelligence model and labeling information output as a result value by the artificial intelligence model, the model prediction code may indicate an assembly of codes (or program) necessary for obtaining a result value for an input value of the trained model, and the operation information on the artificial intelligence model may include resource information such as a CPU, a GPU, a memory, and the like minimally necessary to use the artificial intelligence model.

In addition, the artificial intelligence model client 200 may register the trained artificial intelligence model, the model prediction code, and the operation information on the artificial intelligence model in the model store (not illustrated) by using an interface provided by the electronic device 100.

The artificial intelligence model client 200 may correspond to an electronic device of an artificial intelligence model developer.

Meanwhile, the client 400 may correspond to an electronic device of a user who desires to use the artificial intelligence service.

The client 400 may request the electronic device 100 for a specific artificial intelligence service. In this case, the electronic device 100 may provide the artificial intelligence service to the client 400 by using an artificial intelligence service function corresponding to the artificial intelligence service requested by the client 400 among a plurality of artificial intelligence service functions provided by the plurality of artificial intelligence service clients 300.

Meanwhile, the electronic device 100 may be implemented as a server such as a cloud server, an artificial intelligence server, and the like. However, there is no limitation thereto and the electronic device 100 may be implemented as any electronic devices.

The artificial intelligence model client 200, the artificial intelligence service client 300, and the client 400 may be hardware clients, software clients, applications, and the like. According to an embodiment of the disclosure, the artificial intelligence model client 200, the artificial intelligence service client 300, and the client 400 may be implemented as electronic devices such as a desktop computers, tablet PC, laptops, mobile phones, IoT devices, wearable devices, and the like.

Figure 3:
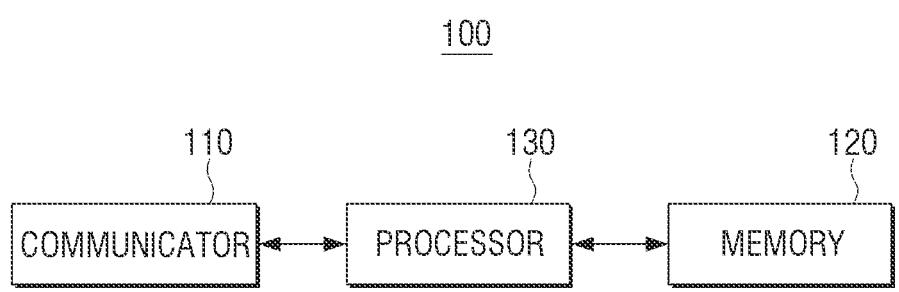
FIG. 3 is a block diagram illustrating a configuration of the electronic device according to an embodiment of the disclosure.

FIG. 3 is a block diagram illustrating a configuration of the electronic device according to an embodiment of the disclosure.

Referring to FIG. 3, an electronic device 100 according to an embodiment of the disclosure may include a communicator 110, a memory 120, and a processor 130.

The communicator 110 may transmit and receive data or signals with an external device by control of the processor 130. The external device herein may be the artificial intelligence model client 200, the artificial intelligence service client 300, and the client 400 of FIG. 2.

The electronic device 100 may receive the trained artificial intelligence model file, the model prediction code of the artificial intelligence model, the operation information on the artificial intelligence model, the artificial intelligence service function, and a request for the artificial intelligence service, and transmit a response to the request of the artificial intelligence service via the communicator 110.

The communicator 110 may include one or more constituent elements for communication via a Local Area Network (LAN), Wide Area Network (WAN), Value Added Network (VAN), a mobile radio communication network, a satellite communication network, and a combination thereof. In addition, the communicator 110 may transmit and receive data or signals directly with an external device or an external server wirelessly using a wireless LAN (e.g., Wi-Fi).

The memory 120 may store various pieces of data, programs, or applications for operating and controlling the electronic device 100. The program stored in the memory 120 may include one or more instructions. The program (one or more instructions) or application stored in the memory 120 may be executed by the processor 130.

The memory 120 may include, for example, an internal memory or an external memory. The internal memory may include, for example, at least one of a volatile memory (e.g., dynamic RAM (DRAM), static RAM (SRAM), or synchronous dynamic RAM (SDRAM), or the like), a non-volatile Memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard drive, or a solid state drive (SSD). The external memory may include a flash drive, for example, a compact flash (CF), secure digital (SD), micro secure digital (Micro-SD), mini secure digital (Mini-SD), extreme digital (xD), multi-media card (MMC), or a memory stick. The external memory may be functionally and/or physically connected to the electronic device 100 via various interfaces.

The memory 120 may be accessed by the processor 130 and reading, recording, editing, deleting, or updating of the data by the processor 130 may be performed.

A term, memory, in the disclosure may include the memory 120, a ROM (not illustrated) and a RANI (not illustrated) in the processor 130, or a memory card (e.g., micro SD card or memory stick) (not illustrated) mounted on the electronic device 100.

According to an embodiment of the disclosure, the memory 120 may include a database including a plurality of functions. The database herein may include functions received from the artificial intelligence service client 300.

The processor 130 may be a constituent element for controlling general operations of the electronic device 100. For example, the processor 130 may control a plurality of hardware or software constituent elements connected to the processor 130 by operating an operating system (OS) and applications, and may perform various data processing and calculations.

The processor 130 may be a central processing unit (CPU), a graphics-processing unit (GPU), or both of them. The processor 130 may be implemented as at least one of a general processor, a digital signal processor, an application specific integrated circuit (ASIC), a system on chip (SoC), a microcomputer (MICOM), and the like.

The processor 130 may identify a container in which the artificial intelligence model is to be loaded, based on attributes of a plurality of artificial intelligence models registered in the model store and attributes of a plurality of containers in which a library for the artificial intelligence models is loaded.

The library loaded in the container may include a library of software (e.g., TensorFlow™ of Google) used to train the artificial intelligence model to be loaded in the container. The container may include the library for the artificial intelligence model to be loaded in the container, in order to load the trained artificial intelligence model and execute a function input to the container using this.

The processor 130 may identify a container in which the artificial intelligence model is to be loaded based on resources provisioned on the plurality of containers and resources required to the plurality of artificial intelligence models. The plurality of containers may execute the function corresponding to the artificial intelligence service requested from the client device based on a graphic processing unit (GPU) or a central processing unit (CPU). The execution of the function corresponding to the artificial intelligence service based on a GPU or a CPU may refer to execution of a function corresponding to the artificial intelligence service using resource such as the GPU or the CPU.

The processor 130 may identify, when the container is generated, whether the container is a CPU container executing a requested function by using a CPU or a GPU container executing a requested function by using a GPU, and obtain resource information and the like provisioned on the container such as a CPU/GPU memory, and the like bound to the container.

The processor 130 may obtain the resource (e.g., CPU, GPU, memory, and the like) information of the electronic device 100 required to the artificial intelligence model based on the operation information on the artificial intelligence model registered in the model store (not illustrated).

The processor 130 may identify a resource usable in each container based on the resources provisioned on the plurality of containers, respectively, and the resources required to the artificial intelligence model loaded in each container, and identify a container in which the artificial intelligence model is to be loaded, based on the identified resource.

If a GPU memory having a capacity of 1 gigabyte is bound to a first container among the plurality of containers, and a first artificial intelligence model loaded in the first container requires a GPU memory having a capacity of 300 megabytes, the processor 130 may determine that the capacity of the GPU memory usable in the first container is 700 megabytes, and determine whether a second artificial intelligence model is able to be loaded in the first container based on this. If a capacity of a resource required by the second artificial intelligence model is 300 megabytes, the processor 130 may determine that the second artificial intelligence model is able to be loaded in the first container. However, if a capacity of the resource required by the second artificial intelligence model is 800 megabytes, the processor 130 may determine that the second artificial intelligence model is not able to be loaded in the first container.

When the trained artificial intelligence model is registered in the model store (not illustrated) by the artificial intelligence model client 200, the processor 130 may identify a container in which the registered artificial intelligence model is to be loaded based on the attributes of the plurality of containers and an attribute of the artificial intelligence model registered in the model store (not illustrated).

The processor 130 may provide an interface to the artificial intelligence model client 200 to allow the artificial intelligence model client 200 to register the trained artificial intelligence model file and the model prediction code of the artificial intelligence model according to the provided interface.

The trained artificial intelligence model file requires a code for executing a model binary file and the corresponding model file, and the code may vary depending on software for training the artificial intelligence model.

Accordingly, the processor 130 may allow the artificial intelligence model client 200 to register the artificial intelligence model file and the model prediction code in the model store (not illustrated) via the same interface so that various codes provided by the plurality of artificial intelligence model clients 200 are able to be executed based on the same library included in the container.

The processor 130 may separately execute a code executed when a request for the function for the model is received and a code for loading the artificial intelligence model in the container before the request for the function by using the interface. In other words, the processor 130 may load the artificial intelligence model in the container before the container obtains the function for the artificial intelligence service request by using the interface. When the container loads the artificial intelligence model in advance, the time taken for the container to execute the function may be saved, since a process for loading the artificial intelligence model by the container which has received the function may be omitted.

The processor 130 may load the artificial intelligence model in the container based on the library loaded in the container. As described above, since the library loaded in the container is a library of software used to train the artificial intelligence model, that is, since the library for training the artificial intelligence model is the same as the library included in the container, the processor 130 may load the trained artificial intelligence model in the container.

Meanwhile, when a request for the artificial intelligence service is received from the client 400 via the communicator 110, the processor 130 may obtain the function corresponding to the requested artificial intelligence service from the database stored in the memory 120.

The function corresponding to the artificial intelligence service is generated by the artificial intelligence service client 300 and the artificial intelligence service client 300 selects the trained artificial intelligence model registered in the model store and generates an artificial intelligence service function including the model prediction code of the selected artificial intelligence model, and accordingly, the function corresponding to the artificial intelligence service may include information on the artificial intelligence model.

The processor 130 may identify the container on which the artificial intelligence model corresponding to the artificial intelligence service is loaded, among the plurality of containers based on the information on the artificial intelligence model included in the obtained function.

Specifically, the processor 130 may identify an artificial intelligence model corresponding to the artificial intelligence service based on the model prediction code of the artificial intelligence model included in the obtained function and identify a container in which the identified artificial intelligence model is loaded based on a model list including information on the container in which the artificial intelligence model is loaded. The model list herein is for identifying the container in which at least one trained artificial intelligence model registered in the model store is loaded among the plurality of containers, and the model list may be updated when the trained artificial intelligence model is loaded in the container.

For example, when the processor 130 receives a request for a face recognition service from the client 400 via the communicator 110, the processor 130 may obtain a face recognition function corresponding to the face recognition service from the database, identify a face recognition artificial intelligence model corresponding to the face recognition service based on the model prediction code of the artificial intelligence model included in the obtained face recognition function, and identify a container in which the identified face recognition artificial intelligence model is loaded by using the model list.

The processor 130 may execute the obtained function in the container where it is identified that the artificial intelligence model for executing the obtained function is loaded.

Specifically, the processor 130 may execute the obtained function based on the library loaded in the container from the container in which the artificial intelligence model for executing the artificial intelligence service is loaded. As described above, since the library loaded in the container is the library of software used to train the artificial intelligence model loaded in the container, the container may obtain a result value (inference value) from an input value input to the trained artificial intelligence model by using the loaded library.

In other words, the processor 130 may obtain data for the request of the client 400 from the artificial intelligence model loaded in the container.

In addition, the processor 130 may transmit the obtained data to the client 400 via the communicator 110.

Meanwhile, the processor 130 may collect information on execution time of the function corresponding to the artificial intelligence service requested by the client 400 from each container.

Specifically, the processor 130 may receive information on time taken for executing the function from the container where the function is executed.

The processor 130 may identify the container where the function is to be executed among the GPU-based container and the CPU-based container based on the received information. Specifically, when executing a function that is same as the executed function later, the processor 130 may determine whether it is efficient to execute the corresponding function in the GPU-based container or it is efficient to execute the corresponding function in the CPU-based container.

If an execution time of a specific function in the GPU-based container is less than a predetermined value, the processor 130 may determine that it is suitable to execute the corresponding function in the CPU-based container. In addition, when receiving a function corresponding to the same artificial intelligence service later, the corresponding function may be executed in the CPU container, not in the GPU container.

However, this is merely an embodiment, and if the execution time of the specific function is the predetermined value or more in the CPU-based container, the processor 130 may determine that it is suitable to execute the corresponding function in the GPU-based container later. Accordingly, when the function corresponding to the artificial intelligence service is received later, the corresponding function may be executed in the GPU container.

As described above, one container may receive the function corresponding to the same artificial intelligence service several times. In this case, the processor 130 may allow the same container to execute the function for the same artificial intelligence service to provide a response to the request for the artificial intelligence service. In other words, if a request for the same artificial intelligence service is received, the processor 130 may reduce the response time for the same request by reusing the resource bound to one container.

Meanwhile, if the number of times of the artificial intelligence services requested to the one container during predetermined time is a predetermined number of times or more, the processor 130 may additionally generate a container for executing the same artificial intelligence service. In other words, if the one container executes the function corresponding to the same artificial intelligence service predetermined number of times or more during the predetermined time, the processor 130 may generate several containers for executing the corresponding function.

When the container executes the obtained function in a first state, the processor 130 may determine that the container is in a second state. The first state herein may indicate a state where the artificial intelligence model is not loaded in the container or a pre-warm state where at least one trained artificial intelligence model is loaded in the container and the container does not execute the function by using the loaded at least one trained artificial intelligence model. The second state may refer to a warm state where the container executed the function by using the loaded at least one trained artificial intelligence model.

In other words, when the container in the pre-warm state executes the function, the processor 130 may determine that the container is changed into the warm state.

If the number of containers in the first state among the plurality of containers is less than a predetermined number, the processor 130 may generate a new container. In other words, the processor 130 may maintain the number of containers in the first state as the predetermined number thereof. Accordingly, if the container in the first state executes the function and changed into the second state, the processor 130 may generate a new container in the first state.

For example, it is assumed that the electronic device 100 maintains three containers in the first state (pre-warm state). When the function corresponding to the requested service is executed based on the first artificial intelligence model in the first container in which the first artificial intelligence model is loaded among the three containers (first, second, and third containers) and it is determined that the first container is changed from the first state to the second state, the processor 130 may determine that the number of containers in the first state is two (second and third containers). In this case, the processor 130 may generate a new container (fourth container) in the first state.

Meanwhile, if the container which executed the obtained function (that is, container in the second state) does not receive a request for the artificial intelligence service using the model included in the container during predetermined time, the processor 130 may kill the container which executed the obtained function.

In other words, if the container which is in the second state by executing the function does not obtain a function using at least one model included in the container during the predetermined time, the processor 130 may kill the container in the second state.

In this case, the processor 130 may identify the container in which at least one artificial intelligence model included in the container to be killed is to be loaded.

As described above, since the predetermined number of containers in the first state needs to be maintained in the electronic device 100, at least the predetermined number of containers may exist, although the container in which the artificial intelligence model is loaded is removed.

The processor 130 may identify a container in which the artificial intelligence model which has been loaded in the killed container is to be newly loaded, based on attributes of remaining containers except for the killed container and the attribute of the artificial intelligence model which has been loaded in the killed container.

Specifically, the processor 130 may identify the container in which the artificial intelligence model which has been loaded in the killed container is to be newly loaded, based on the resource usable in the remaining container except for the killed container and the resource required to the artificial intelligence model which has been loaded in the killed container.

For example, it is assumed that the first to fifth containers exist in the electronic device 100, first and second artificial intelligence models exist in the first container, third and fourth artificial intelligence models exist in the second container, a fifth artificial intelligence model exists in the third container, and the artificial intelligence model is not loaded in the fourth container and the fifth container. If the first container and the second container are in the second state by executing the function and the first container thereof does not receive the function corresponding to the artificial intelligence service during predetermined time (e.g., 1 minute), the processor 130 may kill the first container.

If capacities of the resources necessary for the first and second artificial intelligence models included in the first container are 600 megabytes and 300 megabytes, respectively, a capacity of the resource usable by the second container is 0 megabytes, a capacity of the resource usable by the third container is 400 megabytes, and capacities of the resources usable by the fourth and fifth containers are 1 gigabyte, respectively, the processor 130 may load the first artificial intelligence model in the fourth container and provision the second artificial intelligence model on the third container. However, this is merely an embodiment, and the processor 130 may load the first artificial intelligence model and the second artificial intelligence model in the fourth container or may load the first artificial intelligence model in the fourth container and load the second artificial intelligence model in the fifth container.

Meanwhile, according to various embodiments of the disclosure, the processor 130 may execute a function of at least one of a model coordinator 510, an invoker 520, a GPU runtime container (e.g., container 530), a CPU runtime container (e.g., CPU-based container 540), a controller 550, a queue 560, a model store 210, and a reinforcement training module 590 which will be described with reference to FIGS. 4 and 5.

Figure 4:
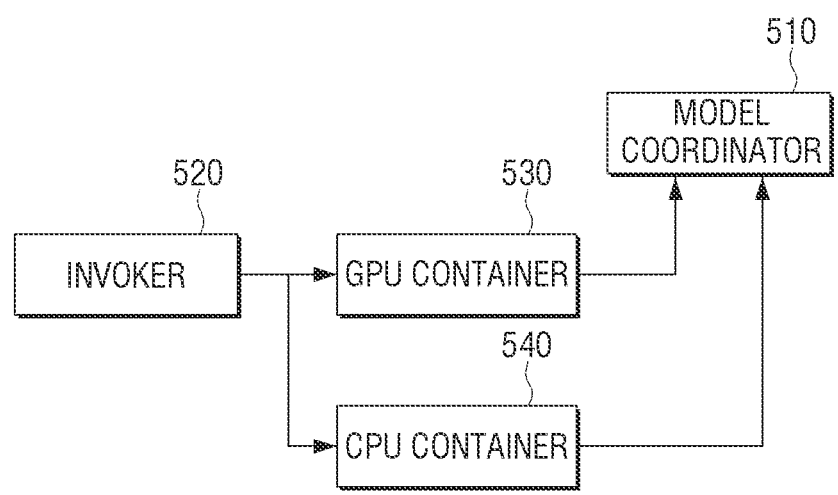
FIG. 4 is a diagram illustrating containers according to an embodiment of the disclosure.
Figure 5:
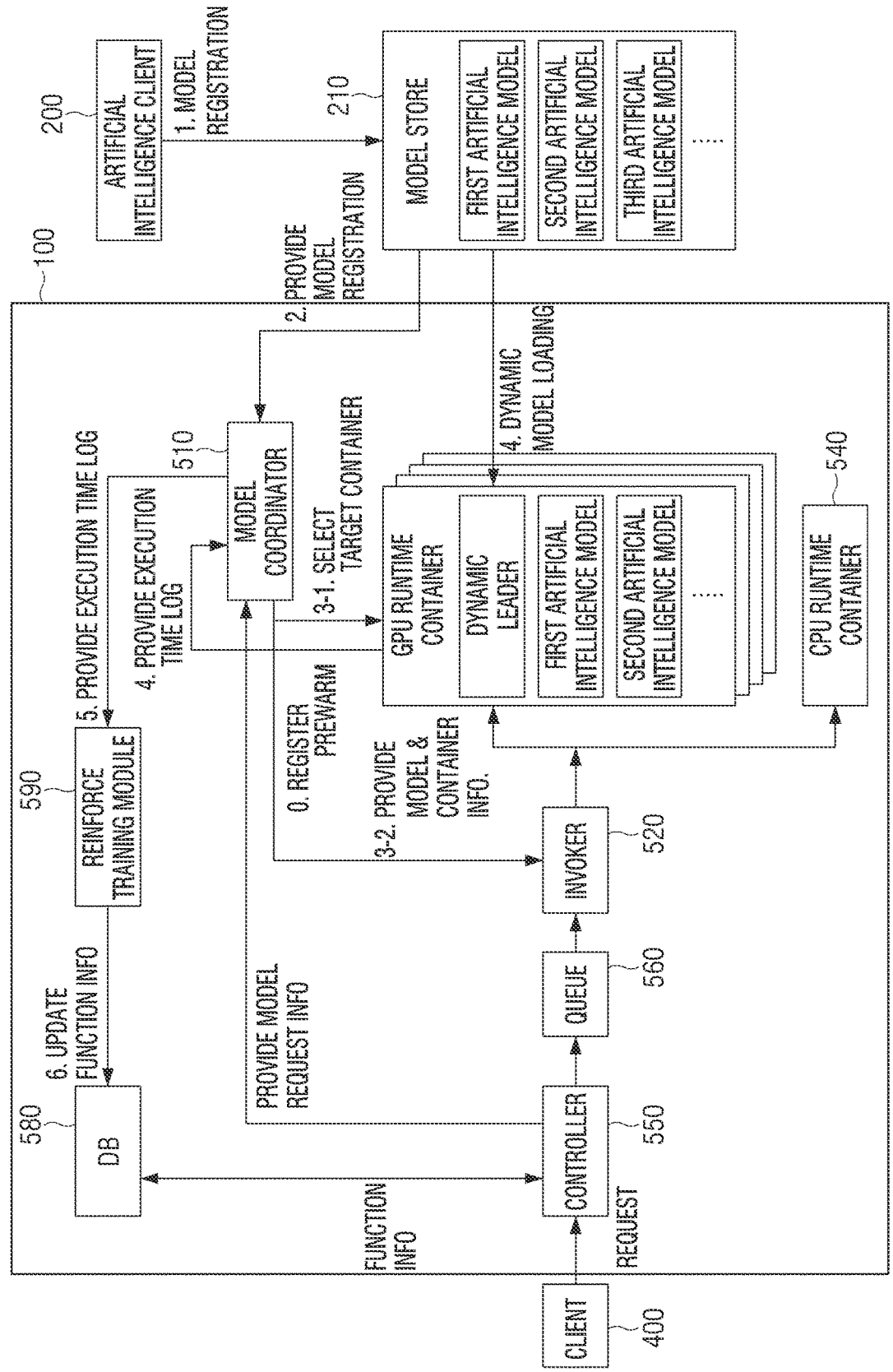
FIG. 5 is a diagram illustrating the electronic device providing an artificial intelligence service corresponding to a request of a client according to an embodiment of the disclosure.

FIGS. 4 and 5 are diagrams illustrating an electronic device according to various embodiments of the disclosure. Specifically, FIG. 4 is a diagram illustrating containers according to an embodiment of the disclosure.

Referring to FIG. 4, an invoker 520 may generate containers 530 and 540. The generated containers may be the CPU-based container 540 which uses the CPU resource and a GPU-based container (e.g., container 530) which uses the GPU resource.

The containers 530 and 540 generated by the invoker 520 may provide container information to the model coordinator 510. The container information herein may include the resource information provisioned on the container and whether the container is the CPU/GPU container.

The container generated by the invoker 520 may include the library for the artificial intelligence model. The container 530 may load the trained artificial intelligence model based on the library for the artificial intelligence model and execute the function by using the loaded artificial intelligence model.

The container in which the artificial intelligence model is not loaded or the container in which at least one artificial intelligence model is loaded but the function is not executed using the loaded artificial intelligence model may be identified as a pre-warm container. In contrast, the container which has executed the function using the loaded artificial intelligence model may be identified as a warm container.

The electronic device 100 according to an embodiment of the disclosure may maintain the pre-warm containers by the predetermined number. The container may load the trained artificial intelligence model in a state of the pre-warm container before receiving the function corresponding to the artificial intelligence service.

When the function corresponding to the artificial intelligence service is received, the pre-warm container may execute the function and changed into the warm container. In this case, since the artificial intelligence model corresponding to the artificial intelligence service has been already loaded in the container, the time taken for the container to execute the function may be saved.

In addition, since the electronic device 100 needs to maintain the predetermined number of pre-warm containers, if the pre-warm container is changed into the warm container, the invoker 520 may generate a new container and the generated container may provide container information to the model coordinator 510.

Meanwhile, a plurality of artificial intelligence models may be loaded in one container.

If the function corresponding to the plurality of artificial intelligence models included in one container is not executed during the predetermined time, the invoker 520 may kill the corresponding container.

If the container is killed by the invoker 520, the model coordinator 510 may allow at least one artificial intelligence model which has been included in the killed container to be loaded in another container.

Specifically, the model coordinator 510 may identify another container in which the at least one artificial intelligence model which has been included in the killed container is to be loaded, based on resource information necessary for the at least one artificial intelligence model which has been included in the killed container and resource information usable in the remaining container except for the killed container. In addition, the model coordinator 510 may transfer information on the artificial intelligence model which has been included in the killed container to the identified container so that the at least one artificial intelligence model which has been included in the killed container is loaded in the identified container.

The container which has received the information on the artificial intelligence model which has been included in the killed container from the model coordinator 510 may load the artificial intelligence model corresponding to the received information on the artificial intelligence model.

The electronic device 100 may provide the artificial intelligence service based on the container.

FIG. 5 is a diagram illustrating the electronic device providing an artificial intelligence service corresponding to a request of a client according to an embodiment of the disclosure.

Referring to FIG. 5, a model store 210 may include a plurality of trained artificial intelligence models. The model store 210 may manage new artificial intelligence models registered by the artificial intelligence model client 200 or artificial intelligence models registered in the model store 210 in advance. Specifically, when the new artificial intelligence models are registered or when the artificial intelligence models registered in advance are updated, the model store 210 may provide registration information or update information to the model coordinator 510.

When the trained artificial intelligence models are registered in the model store 210 by the artificial intelligence model client 200, the model coordinator 510 may allow the containers 530 and 540 to load the trained artificial intelligence models registered in the model store 210.

When the trained artificial intelligence models are registered in the model store 210, the model coordinator 510 may select the containers 530 and 540 in which the trained artificial intelligence models are to be loaded, based on artificial intelligence model information registered in the model store 210, information on models currently loaded in the plurality of containers, and state information of the container which is processing the function corresponding to the currently requested artificial intelligence service, and the like.

For example, the model coordinator 510 may identify the resource usable in each container based on operation information of the artificial intelligence model registered in the model store 210 (e.g., resource information required to the artificial intelligence model), resource information provisioned on each of the plurality of containers, and information on models currently loaded in the plurality of containers, and select the container in which the artificial intelligence model registered in the model store 210 is to be loaded based on this.

In addition, the model coordinator 510 may provide information on the artificial intelligence model to the identified container.

In this case, the containers 530 and 540 may identify the artificial intelligence models to be loaded from the model store 210 based on the information provided from the model coordinator 510, and load the corresponding artificial intelligence models from the model store 210. Although one artificial intelligence model is loaded in the container, the containers 530 and 540 may receive list information of models to be additionally loaded from the model coordinator 510. The list information of the models herein may include list information of trained models stored in the model store 210, that the model coordinator 510 has received from the model store 210.

Specifically, the containers 530 and 540 which have received the information on the artificial intelligence models loaded from the model coordinator 510 may load the artificial intelligence models in the containers 530 and 540 by using a dynamic loader included in the container.

In addition, the model coordinator 510 may provide information on the artificial intelligence model and information on the container in which the artificial intelligence model is loaded to the invoker 520. In this case, as will be described below, the invoker 520 may provide the function corresponding to the requested artificial intelligence service to the container including the artificial intelligence model corresponding to the artificial intelligence service based on the information received from the model coordinator 510.

Meanwhile, the controller 550 may receive a request for the artificial intelligence service from the client 400. The controller 550 may receive, from the client 400, input data of the artificial intelligence service together with the information on the artificial intelligence model for providing the artificial intelligence service for the client 400. If the client 400 requests for a face recognition service, the controller 550 may receive an image file as input data for the face recognition service together with the request for the face recognition service from the client 400.

In this case, the controller 550 may store the request and the input data received from the client 400 in a database 580. The database 580 may store, in advance, identification information on all operations that may be provided using the registered artificial intelligence model.

The controller 550 may obtain, from the database 580, the identification information on the operation required for performing the artificial intelligence service request received from the client 400 and transfer the identification information to the queue 560. Meanwhile, the invokers 520 may exist in plurality, and the controller 550 may designate the invoker 520 on which the obtained function is to be provisioned among the plurality of invokers.

Specifically, the controller 550 may determine the amount of the operation provisioned on the invoker 520 and identify the invoker 520 to which the determined operation is to be transferred. For this, the invoker 520 may provide state information of the invoker 520 to the controller 550 regularly.

The controller 550 may provide the identification information of the operation obtained from the database 580 and the designated invoker information to the queue 560.

The queue 560 may provide the identification information of the operation received from the controller 550 to the designated invoker 520.

The invoker 520 which received the operation information from the queue 560 may search the database 580 to obtain an operation matching to the identification information of the operation. The operation matching to the identification information of the operation may refer to an operation necessary for performing the artificial intelligence service requested from the client 400. In addition, the invoker 520 may obtain a code for performing the operation obtained from the database 580 and input data stored by the client 400.

The invoker 520 may transfer the obtained code of the function to the containers 530 and 540. For this, as described above, the invoker 520 may receive, from the model coordinator 510, the information on the container in which the artificial intelligence model is loaded necessary for performing or executing the obtained function. The invoker 520 may transfer the obtained code of the function and the input data stored in the database 580 by the client 400 to the container in which the corresponding artificial intelligence model is loaded.

In this case, the containers 530 and 540 which received the code of the function from the invoker 520 may execute the function corresponding to the requested artificial intelligence service based on the library loaded in the container. The containers 530 and 540 may execute the function through the controller 550 and provide the obtained result value to the client 400.

The container may include at least one artificial intelligence model. As described above, the artificial intelligence model loaded in the container may be an artificial intelligence model registered in the model store through an interface provided by the electronic device 100. In addition, the code of the function obtained by the invoker 520 may be a function code provided by the artificial intelligence service client 300, and the artificial intelligence service client 300 may generate the function using the artificial intelligence model and the model prediction code registered in the model store.

In other words, since the function obtained by the containers 530 and 540 from the invoker 520 is created through the same interface as the artificial intelligence model loaded in the container, the containers 530 and 540 may execute the function by using the artificial intelligence models loaded in the containers. Specifically, the container may obtain a result value by setting the input data provided by the client 400 as the input value of the artificial intelligence model. The result value herein may indicate a result value obtained by executing the function by the artificial intelligence model.

Meanwhile, the containers 530 and 540 may transfer execution time information (execution time log) of the function to the model coordinator 510 and the model coordinator 510 may provide the function execution time information of the container to the reinforcement training module 590.

The reinforcement training module 590 may receive information on the time when the function is executed in each container, and determine, if the same function is executed in the container later, whether it is to be executed in a GPU-based container (e.g., container 530) or in the CPU-based container 540. For example, if the function execution time of the GPU-based container is shorter than predetermined time, the reinforcement training module 570 may determine that it is efficient to execute the corresponding function in the CPU-based container, if the corresponding function is called again. In addition, if the function execution time of the CPU-based container is equal to or longer than the predetermined time, the reinforcement training module 590 may determine that it is efficient to execute the corresponding function in the GPU-based container, if the corresponding function is called again.

In addition, the reinforcement training module 590 may determine the execution time information, and if the container information corresponding to the function is changed, the reinforcement training module 590 may update the information of the corresponding function stored in the database 580.

Accordingly, if the request for the artificial intelligence service corresponding to the same function is received later, the controller 550 may receive the information on the function updated from the database and the corresponding function may be executed in the container to which the function execution time is reflected.

FIG. 6 is a flowchart illustrating a method for controlling an electronic device according to an embodiment of the disclosure.

Referring to FIG. 6, a container in which an artificial intelligence model is to be loaded may be identified based on attributes of a plurality of containers in which a library for the artificial intelligence model is loaded and attributes of a plurality of artificial intelligence models registered in a model store at operation S610.

Specifically, the container in which the artificial intelligence model is to be loaded may be identified based on a resource provisioned on the plurality of containers and a resource required to the plurality of artificial intelligence models.

More specifically, a resource usable in each container may be identified based on the resource provisioned to each of the plurality of containers and the resource required to the artificial intelligence model loaded in each container, and the container in which the artificial intelligence model is to be loaded may be identified based on the identified resource.

When the artificial intelligence model is registered in the model store, the container in which the registered artificial intelligence model is to be loaded may be identified based on the attributes of the plurality of containers and the attributes of the registered artificial intelligence model.

Meanwhile, the artificial intelligence model may be loaded in the container based on the library loaded in the container at operation S620.

When a request for the artificial intelligence service is received from the client, a function corresponding to the requested artificial intelligence service may be obtained from a database including a plurality of functions at operation S630.

A container in which the artificial intelligence model corresponding to the artificial intelligence service is loaded may be identified among a plurality of containers at operation S640.

The plurality of containers may execute the function corresponding to the requested artificial intelligence service in a client device based on graphic processing unit (GPU) or a central processing unit (CPU).

The function obtained based on the library loaded in the container may be executed in the container and data for the request may be obtained from the artificial intelligence model loaded in the identified container at operation S650.

Meanwhile, when the function obtained while the container is in the first state is executed, the state of the container may be determined as the second state.

If the number of containers in the first state among the plurality of containers is less than a predetermined number, a new container may be generated.

On the other hand, if the container executed the obtained function does not receive the request for the artificial intelligence service using the model included in the container during the predetermined time, the container executed the obtained function may be killed.

A container in which the artificial intelligence model which has been loaded in the killed container is to be newly loaded may be identified based on attributes of remaining containers except for the killed container and an attribute of the artificial intelligence model which has been loaded in the killed container.

The obtained data may be transmitted to the client at operation S660.

Meanwhile, information on execution time of the function corresponding to the requested artificial intelligence service may be collected from the client in each container.

A container in which the function is to be executed may be identified among the GPU-based container and the CPU-based container based on the collected info.

According to the various embodiments of the disclosure, the artificial intelligence model corresponding to the artificial intelligence service may be loaded in advance before the function corresponding to the artificial intelligence service is transferred to the container, and the function execution time of the container may be reduced. In addition, when the request for the same artificial intelligence service is received during the predetermined time, the response time may be reduced by reusing the same resource bound to the container. In addition, since only one container is basically provided for one artificial intelligence service, the resource of the electronic device may be efficiently used.

The various embodiments described above may be implemented as software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In particular, the various embodiments described above may be implemented by the processor 130 of the electronic device 100. According to the implementation in terms of software, the embodiments such as procedures and functions described in this specification may be implemented as separate software modules. Each of the software modules may perform one or more functions and operations described in this specification.

Various embodiments of the disclosure may be implemented as software including instructions stored in machine (e.g., computer)-readable storage media. The machine is a device which invokes instructions stored in the storage medium and is operated according to the invoked instructions, and may include the electronic device 100 according to the disclosed embodiments.

In a case where the instruction is executed by a processor, the processor may perform a function corresponding to the instruction directly or using other elements under the control of the processor. The instruction may include a code made by a compiler or a code executable by an interpreter. For example, the method for controlling the electronic device may be performed by executing the instructions stored in the storage medium by the processor.

The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™ and AppStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An artificial intelligence service providing method based on a serverless platform, the method comprising:
    identifying a container in which an artificial intelligence model is to be loaded, based on attributes of a plurality of containers in which a library for artificial intelligence models is loaded and attributes of a plurality of artificial intelligence models registered in a model store;
    in advance to receiving a request for an artificial intelligence service, loading the artificial intelligence model in the container based on the library loaded in the containers;
    based on the request for an artificial intelligence service being received from a client, obtaining a function corresponding to the requested artificial intelligence service from a database including a plurality of functions;
    identifying a container in which an artificial intelligence model corresponding to the artificial intelligence service is loaded among the plurality of containers in which artificial intelligence models are loaded;
    obtaining data for the request from the artificial intelligence model loaded in the identified container by executing, in the container, the obtained function based on the library loaded in the container;
    transmitting the obtained data to the client;
    based on the obtained function being executed while the container is in a first state, identifying a state of the container as a second state; and
    based on a number of containers in the first state among the plurality of containers being less than a predetermined number, generating a new container,
    wherein the first state comprises a state where the artificial intelligence model is not loaded in the container or a pre-warm state where the container does not execute the obtained function, and
    wherein the second state comprises a warm state where the container executed the obtained function.

2. The artificial intelligence service providing method according to claim 1, wherein the identifying of the container in which the artificial intelligence model is to be loaded comprises identifying the container in which the artificial intelligence model is to be loaded based on resources provisioned to the plurality of containers and resources required by the plurality of artificial intelligence models.

3. The artificial intelligence service providing method according to claim 2,
    wherein the identifying of the container in which the artificial intelligence model is to be loaded comprises identifying a resource usable in each container based on the resources provisioned respectively to the plurality of containers and the resources required by the artificial intelligence model loaded in each container, and
    wherein the identifying of the container in which the artificial intelligence model is to be loaded is based on the identified resource.

4. The artificial intelligence service providing method according to claim 1,
    wherein the identifying of the container in which the artificial intelligence model is to be loaded comprises, based on the artificial intelligence model being registered in the model store, identifying the container in which the registered artificial intelligence model is to be loaded based on the attributes of the plurality of containers and the attribute of the registered artificial intelligence model.

5. The artificial intelligence service providing method according to claim 1, further comprising:
    based on the container which has executed the obtained function not receiving a request for an artificial intelligence service using a model included in the container during predetermined time, killing the container which has executed the obtained function.

6. The artificial intelligence service providing method according to claim 5, wherein the identifying of the container in which the artificial intelligence model is to be loaded comprises identifying a container in which the artificial intelligence model which has been loaded in the killed container is to be newly loaded, based on attributes of remaining containers except for the killed container and an attribute of the artificial intelligence model which has been loaded in the killed container.

7. The artificial intelligence service providing method according to claim 1, wherein the plurality of containers execute a function corresponding to an artificial intelligence service requested from the client based on a graphic processing unit (GPU) or a central processing unit (CPU).

8. The artificial intelligence service providing method according to claim 7, further comprising:
    collecting information on execution time of the function in each container, the function corresponding to the artificial intelligence service requested from the client,
    wherein the identifying of the container in which the artificial intelligence model is to be loaded comprises identifying a container in which the function is to be executed among a GPU-based container and a CPU-based container based on the collected information.

9. An electronic device providing an artificial intelligence service based on a serverless platform, the electronic device comprising:
    a communicator;
    a memory comprising a database including a plurality of functions; and
    a processor configured to:
        identify a container in which an artificial intelligence model is to be loaded, based on attributes of a plurality of containers in which a library for artificial intelligence models is loaded and attributes of a plurality of artificial intelligence models registered in a model store,
        in advance to receiving a request for an artificial intelligence service, load the artificial intelligence model in the container based on the library loaded in the containers,
        based on the request for an artificial intelligence service being received from a client via the communicator, obtain a function corresponding to the requested artificial intelligence service from the database,
        identify a container in which an artificial intelligence model corresponding to the requested artificial intelligence service is loaded among the plurality of containers, obtain data for the request from the artificial intelligence model loaded in the identified container by executing, in the container in which the artificial intelligence model corresponding to the artificial intelligence service is loaded, the obtained function based on the library loaded in the container, and transmit the obtained data to the client via the communicator, wherein the processor is further configured to:
based on the obtained function being executed while the container is in a first state, identify a state of the container as a second state,
based on a number of containers in the first state among the plurality of containers being less than a predetermined number, generate a new container, wherein the first state comprises a state where the artificial intelligence model is not loaded in the container or a pre-warm state where the container does not execute the obtained function, and wherein the second state comprises a warm state where the container executed the obtained function.

10. The electronic device according to claim 9, wherein the processor is further configured to identify the container in which the artificial intelligence model is to be loaded based on resources provisioned to the plurality of containers and resources required to by the plurality of artificial intelligence models.

11. The electronic device according to claim 10, wherein the processor is further configured to:
identify a resource usable in each container based on the resources provisioned respectively to the plurality of containers and the resources required by the artificial intelligence model loaded in each container, and
identify the container in which the artificial intelligence model is to be loaded based on the identified resource.

12. The electronic device according to claim 9, wherein the processor is further configured to, based on the artificial intelligence model being registered in the model store, identify the container in which the registered artificial intelligence model is to be loaded based on the attributes of the plurality of containers and the attribute of the registered artificial intelligence model.

13. The electronic device according to claim 9, wherein the processor is further configured to, based on the container which has executed the obtained function not receiving a request for an artificial intelligence service using a model included in the container during predetermined time, kill the container which has executed the obtained function.

\* \* \* \* \*